(12) United States Patent
Sheu et al.

(10) Patent No.: US 7,706,366 B2
(45) Date of Patent: Apr. 27, 2010

(54) WIRELESS COMMUNICATION SYSTEM, METHOD FOR TRANSMITTING FRAME, AND COMPUTER PROGRAM PRODUCT THEREOF

(75) Inventors: Shiann-Tsong Sheu, Taipei (TW); Heng-lang Hsu, Taipei (TW); Chih-Chiang Hsieh, Kaohsiung County (TW); Wu-Chi Wang, Hsinchu (TW)

(73) Assignee: Institute for Information Industry, Taipei (TW)

( * ) Notice: Subject to any disclaimer, the term of this patent is extended or adjusted under 35 U.S.C. 154(b) by 986 days.

(21) Appl. No.: 11/385,467

(22) Filed: Mar. 21, 2006

(65) Prior Publication Data

US 2007/0115965 A1 May 24, 2007

(30) Foreign Application Priority Data

Nov. 22, 2005 (TW) .............................. 94140996 A

(51) Int. Cl.
*H04L 12/56* (2006.01)
(52) U.S. Cl. ...................................... 370/389; 370/432
(58) Field of Classification Search ................ 370/317, 370/328, 335, 337, 342, 389, 432; 455/550.1, 455/561
See application file for complete search history.

(56) References Cited

U.S. PATENT DOCUMENTS

| | | | | |
|---|---|---|---|---|
| 6,941,113 B2 * | 9/2005 | Asano | ......................... | 455/73 |
| 7,321,614 B2 * | 1/2008 | Jacobsen et al. | ............. | 375/221 |
| 7,333,556 B2 * | 2/2008 | Maltsev et al. | .............. | 375/295 |
| 2002/0196766 A1 * | 12/2002 | Hwang et al. | ............... | 370/342 |

* cited by examiner

*Primary Examiner*—CongVan Tran
(74) *Attorney, Agent, or Firm*—Patterson, Thuente, Skaar & Christensen, P.A.

(57) ABSTRACT

A wireless communication system, method for transmitting a frame, and computer program product thereof are provided. The system comprises a base station and a subscriber station. The frame comprises a MAP area and a user area. The MAP area comprises a broadcast test area. The method and the computer program product thereof operate: the base station initially transmitting a first burst in the user area by a first transmission module; determining whether the first burst that is transmitted by the first transmission module fits a special situation; and if yes, the base station transmitting test information in the broadcast test area by a second transmission module or asking the subscriber station to transmit data by a second transmission module.

19 Claims, 5 Drawing Sheets

WIRELESS COMMUNICATION SYSTEM, METHOD FOR TRANSMITTING FRAME, AND COMPUTER PROGRAM PRODUCT THEREOF

CROSS-REFERENCES TO RELATED APPLICATIONS

This application claims priority to Taiwan Patent Application No. 094140996 filed on Nov. 22, 2005.

BACKGROUND OF THE INVENTION

1. Field of the Invention

The present invention relates to a wireless communication system and a method for transmitting a frame and a computer program product thereof, specifically to a wireless system and a method for transmitting a frame by dynamically changing the transmission mode and a computer program product thereof.

2. Descriptions of the Related Art

In recent years, while techniques of wired communication are developed slowly, those of wireless communication for portable mobile devices are developed rapidly due to the mass demand so it becomes the important developing field for the communication industry in the future. Wireless communication means to transmit data utilizing radio and the communication quality consequently is usually degraded by external interferences, which decrease transmission speed and reduce data rate. Therefore, how to increase the transmission speed and how to improve the data rate are the key issues in this field.

There exist many transmission modes for wireless communication systems, such as binary phase shift keying (BPSK), quadrature phase shift keying (QPSK), 16 quadrature amplitude modulation (16QAM), and 64 quadrature amplitude modulation (64QAM). Whether these transmission modes can be used relates greatly to the channel quality of a wireless communication system.

One category of the prior techniques for increasing transmission speed and data rate of a wireless communication system is to change transmission mode dynamically. The transmission mode is changed according to the carrier to interference plus noise power ratio (CINR) of the channel estimated by the terminal device. Different transmission modes need different levels of CINR. Changing transmission mode dynamically is to determine whether to adjust the transmission mode according to CINR values in order to achieve more stable and faster transmission speed.

The aforementioned method uses only the estimated CINR value to determine whether to change the transmission mode or not. Consequently, CINR estimator plays the key role here, i.e., the error affects the estimated value. If a higher channel quality of a wireless communication system is required, a better estimator is required as well, which increases the cost of a terminal apparatus. If a worse estimator is chosen, the efficiency of choosing transmission mode will be degraded. Consequently, how to increase the transmission speed and the data rate of a wireless communication system by dynamically changing transmission mode in a more efficient way and how to reduce the cost of terminal apparatus at the same time are the key issues.

SUMMARY OF THE INVENTION

An object of this invention is to provide a method for wireless communication utilizing a frame, which comprises a MAP area and a user area. The MAP area defines a broadcast test area. The method comprises the following steps of: transmitting a burst of the user area by a first transmission mode; determining whether the burst transmitted by the first transmission mode conforms to a specific situation; if yes, then transmitting a test data by a second transmission mode in the broadcast test area; determining whether the transmission by the second transmission mode has a better transmission quality; if yes, then transmitting the burst by the second transmission mode.

Another object of this invention is to provide a computer program product for storing a computer program, which executes the aforementioned method.

Another object of this invention is to provide a wireless communication method for transmitting a second frame according to a first frame, the first frame comprising a MAP area, the MAP area defining a broadcast test area, the second frame comprising a user area, the user area defining a first burst and a second burst. The method comprises the following steps of: transmitting the first burst by a first transmission mode; determining whether the transmission by the first transmission mode conforms to a specific situation; if yes, then transmitting a request in the broadcast test area; and transmitting the first burst by the first transmission mode and the second burst by a second transmission mode in response to the request.

Another object of this invention is to provide a computer program product for storing a computer program, which executes the aforementioned method.

Another object of this invention is to provide a base station for wirelessly communicating with a terminal apparatus utilizing a frame, which comprises a MAP area and a user area. The MAP area defines a broadcast test area. The base station initially transmits a burst of the user area by a first transmission mode. If the base station determines that the transmission by the first transmission mode conforms to a specific situation, the base station transmits a test data by a second transmission mode in the broadcast test area. If the base station determines that the transmission by the second transmission mode has a better transmission quality, the base station transmits the burst by the second transmission mode.

Another object of this invention is to provide a terminal apparatus for wirelessly communicating with a base station. The terminal apparatus transmits a second frame according to a first frame, which comprises a MAP area. The MAP area defines a broadcast test area. The second frame comprises a user area, which defines a first burst and a second burst. The terminal apparatus initially transmits the first burst by a first transmission mode in the second frame. If the base station determines that the transmission by the first transmission mode conforms to a specific situation, the base station transmits a request in the broadcast test area. The terminal apparatus transmits the first burst by the first transmission mode and the second burst by a second transmission mode in response to the request.

The base station of this invention provides the information of different transmission modes for all terminal apparatus in the broadcast test area of the transmitted frame. All terminal apparatus determine a faster and more stable transmission mode according to the information. By using this approach, the transmission speed and the data rate of a wireless communication system are increased.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
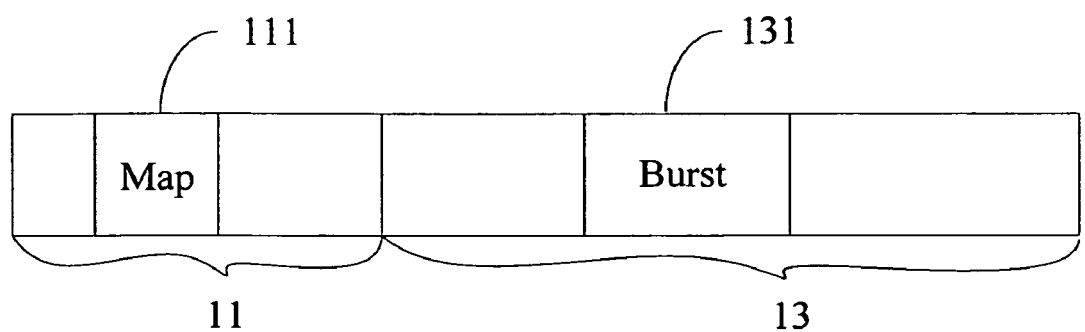
FIG. 1 is a diagram of the downstream frame of this invention.

A first embodiment of this invention is a method for wireless communication utilizing a frame. The frame is illustrated in FIG. 1, which comprises a broadcast information area 11 and a user area 13. The broadcast information area 11 further comprises a MAP area 111, which is used to determine the receiving time of data transmission and the transmission mode. The user area 13 comprises a plurality of bursts. Every burst is used to store data to be transmitted to some specific objective device, such as burst 131, storing data which is transmitted to a first objective device. To be more specifically, the MAP area 111 further comprises a downlink MAP area and an uplink MAP area, which determine receiving times of data transmission and transmission modes for downstream and upstream respectively.

Figure 2:
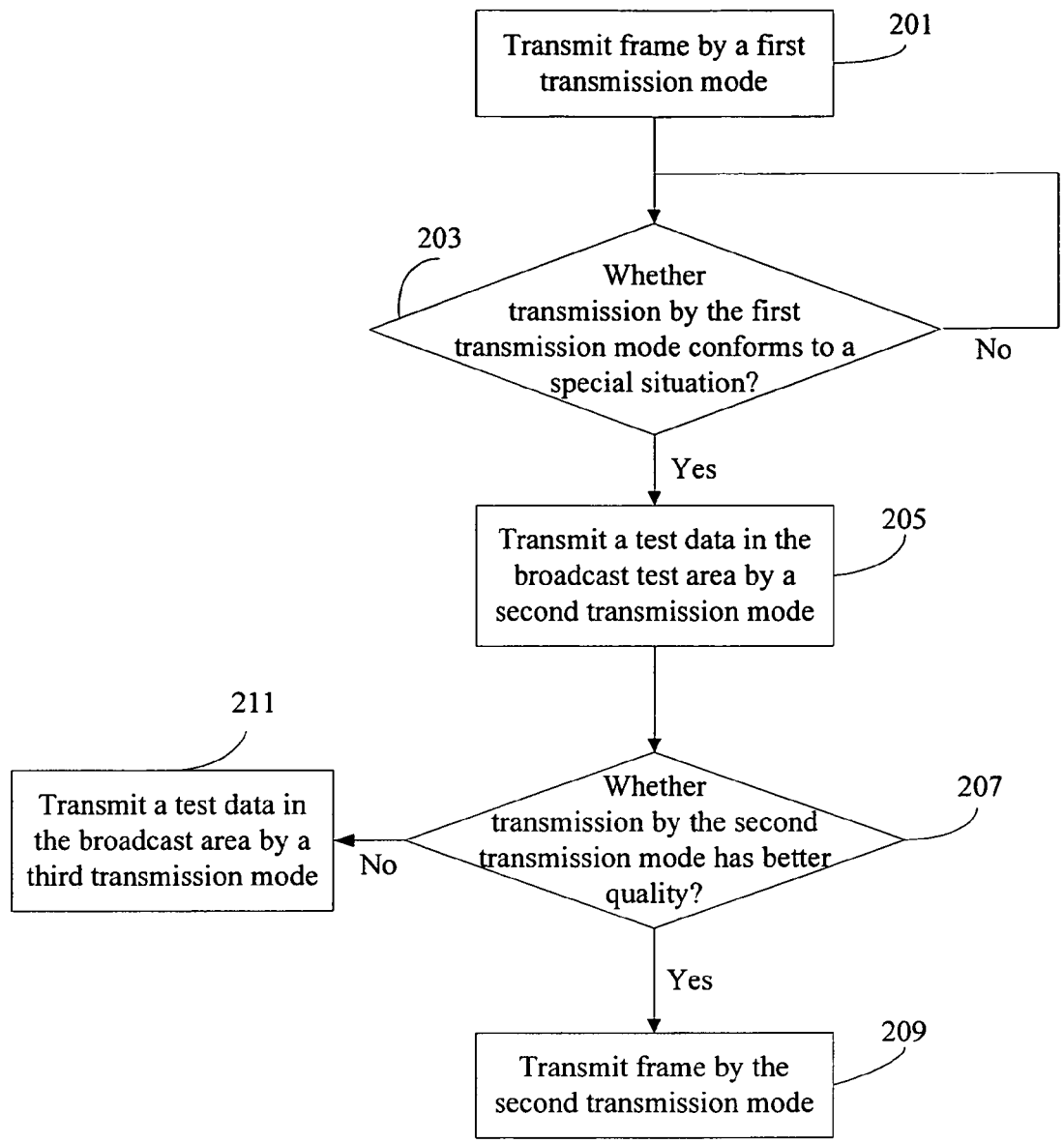
FIG. 2 is a flowchart of a first embodiment of this invention.

The method is illustrated in FIG. 2, which is a method for the base station to transmit downstream a burst to the terminal apparatus. When step 201 is executed, the base station transmits a burst 131 by a first transmission mode. When step 203 is executed, the base station determines whether the burst 131 transmitted by the first transmission mode conforms to a specific situation. If no, step 203 is returned and the base station re-determines whether the burst 131 transmitted by the first transmission mode conforms to a specific situation after a predetermined time interval. If yes, then step 205 is executed, wherein a broadcast test area is defined in the MAP area 111 and a test data is transmitted by the second transmission mode in the broadcast test area. Following that step 207 is executed, wherein the base station determines whether the burst 131 transmitted by the second transmission mode will have a better transmission quality. If no, it means that the burst 131 transmitted by the second transmission mode will not have a better transmission quality and the step 211 is executed consequently to transmit the test data by a third transmission mode in the broadcast test area. If yes, step 209 is executed, wherein the base station transmits the burst 131 by the second transmission mode. Thus, better transmission quality is achieved by changing the transmission mode dynamically in a more efficient way.

The specific situations in step 203 comprise changes of transmission speed, changes of CINR, or changes of bit error rate. When these situations occur, the method tries to transmit a test data by a second transmission mode and then determines whether a better transmission quality will be achieved if the burst 131 is transmitted by the second transmission mode. The first transmission mode and the second transmission mode are different in modulation.

More specifically, a transmission quality coefficient, relating to the changes of transmission speed, changes of CINR, or changes of bit error rate, is calculated to evaluate each of the transmission quality of different transmission modes respectively. With regard to the better transmission quality, it relates to the comparison between a first transmission quality coefficient of the first transmission mode with a second transmission quality coefficient of the second transmission mode. If the second transmission quality coefficient is larger than the first transmission quality coefficient, the burst is transmitted by the second transmission mode. On the other hand, if the first transmission quality coefficient is larger than the second transmission quality coefficient, the test data is transmitted by the third transmission mode in the broadcast test area. The following embodiment will explain this in detail.

Figure 3:
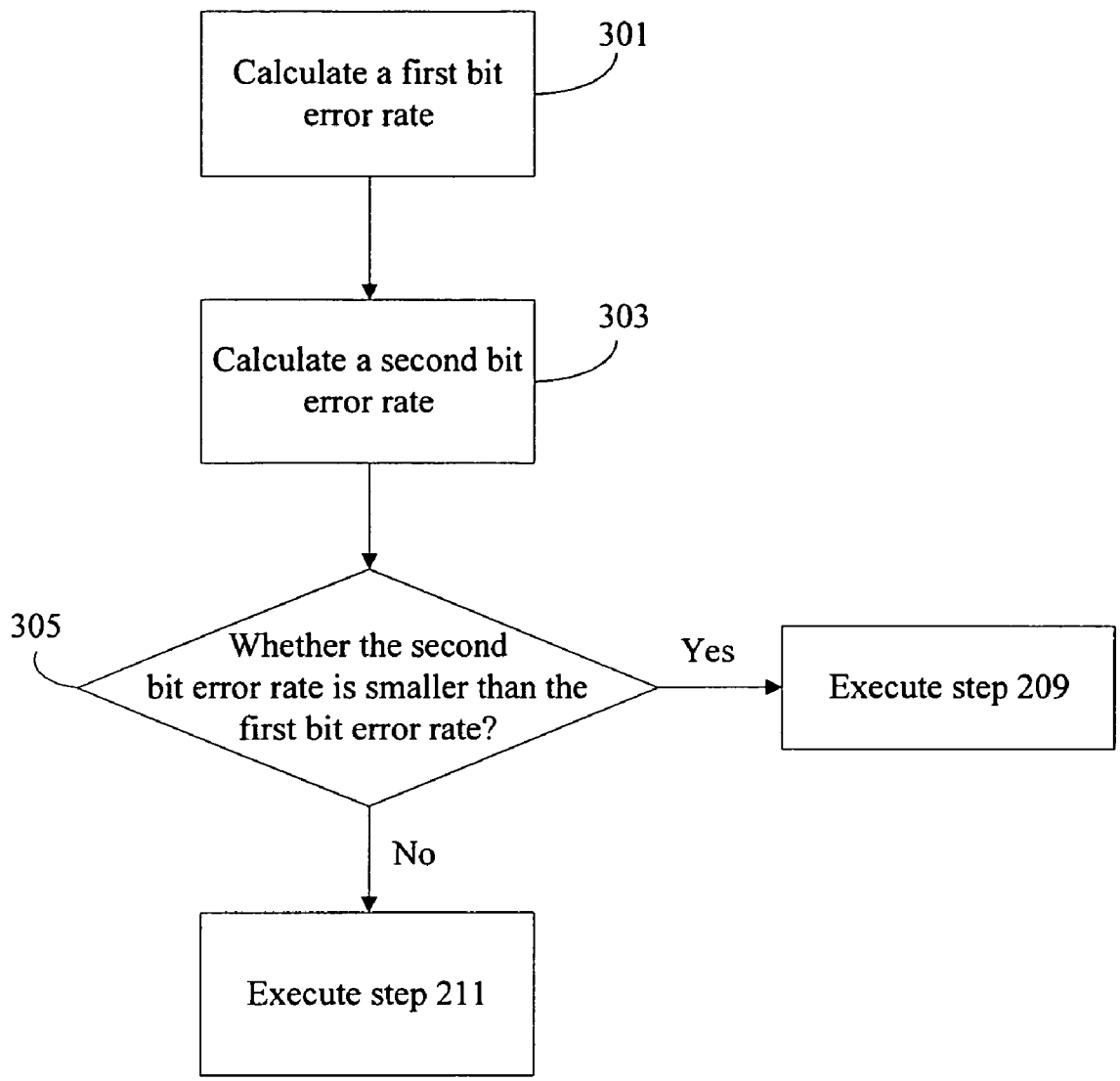
FIG. 3 is a flowchart of determining the BER in the first embodiment.

If the specific situation is bit error rate being increased, step 207 further comprises the steps as illustrated in FIG. 3. When step 301 is executed, a first bit error rate of transmitting the burst 131 by the first transmission mode is calculated. When step 303 is executed, a second bit error rate of transmitting the burst 131 by the second transmission mode is calculated. When step 305 is executed, determine whether the second bit error rate is smaller than the first bit error rate. If yes, the second transmission mode has a better transmission quality and then step 209 is executed. If no, it means that transmitting by the second transmission mode will not have a better transmission quality, so step 211 is executed to transmit the test data in the broadcast test area by a third transmission mode. If the bit error rate of transmitting the burst 131 by the third transmission mode is still not smaller than the first bit error rate, step 309 is executed continuously to select yet another transmission mode to transmit the test data. In these steps, transmission speeds and CINR values can be calculated and be used to compare the transmission quality between different transmission modes.

Figure 4:
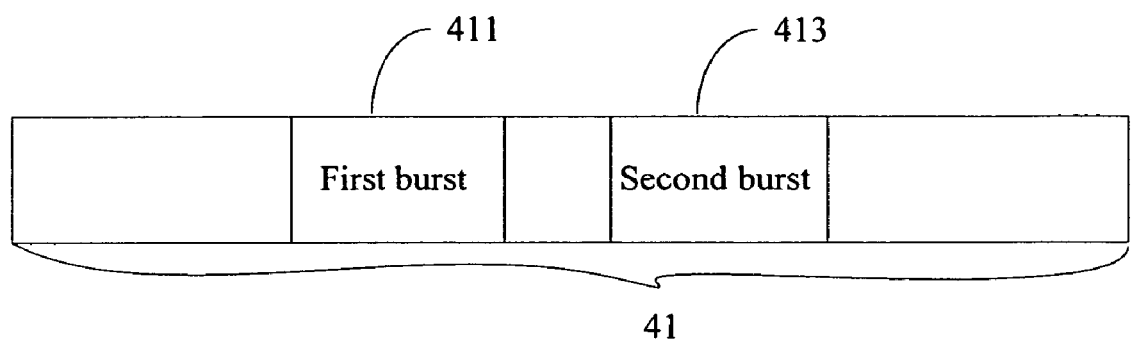
FIG. 4 is a diagram of the upstream frame of this invention.

A second embodiment of this invention is a wireless transmission method. The method transmits a second frame according to a first frame. As illustrated in FIG. 1, the first frame is a downstream frame which comprises a MAP area 111, defining a broadcast test area. As illustrated in FIG. 4, the second frame is an upstream frame which comprises a user area 41, defining a first burst 411 and a second burst 413.

Figure 5:
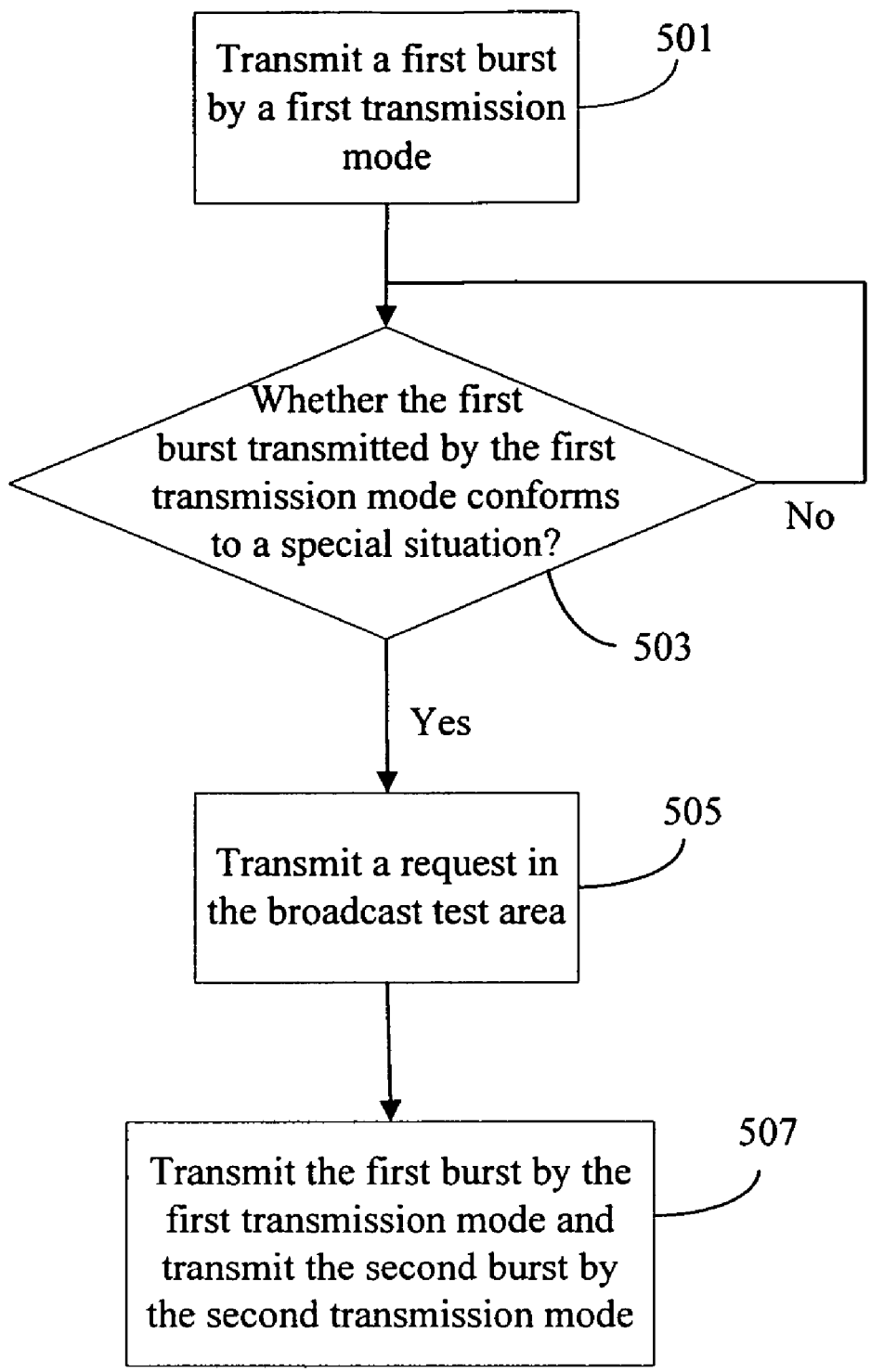
FIG. 5 is a flowchart of a second embodiment of this invention.

The method is shown in FIG. 5, which is an upstream transmission method for transmitting a burst from a terminal apparatus to a base station. When step 501 is executed, the terminal apparatus transmits the first burst 411 by a first transmission mode. When step 503 is executed, the base station determines whether the first burst transmitted by the first transmission mode conforms to a special situation. If no, go back to step 503 and re-determine whether the first burst transmitted by the first transmission mode conforms to a special situation after a predetermined time interval. If yes, then step 505 is executed, where the base station transmits a request in the broadcast test area and requests the terminal apparatus to try to use the second transmission mode for transmission. In step 507, the terminal apparatus, in response to the request, transmits the burst 411 by the first transmission mode and transmit the burst 413 by the second transmission mode.

The specific situations in step 503 comprise changes of transmission speed, changes of CINR, and changes of bit error rate. When these situations occur, the method tries to transmit the second burst by the second transmission mode, wherein the data of the first burst is the same as that of the second burst so that the base station can determine whether changing to the second mode will have a better transmission quality. The first transmission mode and the second transmission mode are different in modulation power.

The above methods can use a computer program product, which stores a computer program to execute the steps. The computer program product can be a floppy disk, a hard disk, an optical disc, a flash disk, a tape, a network accessible database or a storage medium with the same functionality which can be easily thought by people skilled in the field.

A third embodiment of this invention is a wireless communication system, which transmits downstream a frame. The wireless communication system comprises a base station and a terminal apparatus and follows IEEE 802.16 standard. In this standard, BPSK ½, QPSK ½, QPSK ¾, 16QAM ½, 16QAM ¾, 64QAM ⅔, and 64QAM ¾ can be used. When the base station intends to transmit a frame, the objective device to receive the burst 131 is the terminal apparatus as illustrated in FIG. 1. The base station uses 64QAM ⅔ modulation (a first transmission mode), for example, to transmit the burst 131. When the base station notices that the bit error rate is increased, it transmits a test data in the broadcast test area of the downstream MAP area by QPSK ½ modulation (a second transmission mode), for example. When the terminal apparatus receives the burst 131, it determines whether the bit error rate of the QPSK ½ is smaller than that of 64QAM ⅔. If yes, the terminal apparatus transmits a response signal to the base station. The base station transmits the burst 131 by the QPSK ½ modulation thereafter.

A fourth embodiment of this invention is a wireless communication system, which transmits upstream a frame. The wireless communication system comprises a base station and a terminal apparatus and follows IEEE 802.16 standard. In this standard, BPSK ½, QPSK ½, QPSK ¾, 16QAM ½, 16QAM ¾, 64QAM ⅔, and 64QAM ¾ can be used. When the terminal apparatus uses 64QAM ⅔ modulation (a first transmission mode), for example, to transmit a first burst 411 to the base station in the second frame.

If the base station notices that the CINR is decreased, a request is transmitted in the broadcast test area of the uplink MAP area of the first frame. The request is also transmitted by 64QAM ⅔ modulation with increasing transmission power (a second transmission mode) to request the terminal apparatus to transmit a second burst 413 in the second frame. When the base station receives the second frame again, it determines whether the transmission by the 64QAM ⅔ with increased transmission power has greater CINR than transmission by the 64QAM ⅔ with original transmission power. If yes, the base station responds to the terminal apparatus. The terminal apparatus changes the second frame to the 64QAM ⅔ modulation with increased transmission power (the second transmission mode) thereafter and then transmits the second frame.

From the above description, this invention can improve the shortcomings of prior methods of changing transmission modes dynamically by means of transmitting different test data of different defined transmission modes in the broadcast test area of the MAP area. This invention can help a wireless communication system to get a transmission mode with a better transmission quality.

The above embodiments are used as examples to show the process and the result of the subject invention but not used to limit the scope of the subject invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for wireless communication utilizing a frame, the frame comprising a MAP area and a user area, the MAP area defining a broadcast test area, the method comprising the following steps of:
    (a) transmitting a burst of the user area by a first transmission mode;
    (b) transmitting a test data by a second transmission mode in the broadcast test area as the transmission by the first transmission mode conforms to a specific situation; and
    (c) calculating a first transmission quality coefficient of the first transmission mode and a second transmission quality coefficient of the second transmission mode;
    wherein the specific situation comprises one of changes of a transmission speed, a carrier to interference plus noise power ratio (CINR) and a bit error rate (BER).

2. The method of claim 1, further comprising the following steps of:
    (d) transmitting the burst by the second transmission mode as the second transmission quality coefficient is larger than the first transmission quality coefficient.

3. The method of claim 1, further comprising the following step of:
    (e) transmitting the test data by a third transmission mode in the broadcast test area as the first transmission quality coefficient is larger than the second transmission quality coefficient.

4. The method of claim 1, wherein the first transmission quality coefficient and the second transmission quality coefficient individually respond to the specific situation's change of the first transmission mode and the second transmission mode.

5. The method of claim 1, wherein the first transmission mode and the second transmission mode are different in modulation.

6. A wireless communication method for transmitting a second frame according to a first frame, the first frame comprising a MAP area, the MAP area defining a broadcast test area, the second frame comprising a user area, the user area defining a first burst and a second burst, the method comprising the following steps of:
    (a) transmitting the first burst by a first transmission mode;
    (b) transmitting a request in the broadcast test area as the transmission by the first transmission mode conforms to a specific situation; and
    (c) transmitting the first burst by the first transmission mode and the second burst by a second transmission mode in response to the request;
    wherein the specific situation comprises one of changes of a transmission speed, a carrier to interference plus noise power ratio (CINR) and a bit error rate (BER).

7. The wireless communication method of claim 6, wherein the first transmission mode and the second transmission mode are different in transmission power.

8. A base station for wirelessly communicating with a terminal apparatus utilizing a frame, the frame comprising a MAP area and a user area, the MAP area defining a broadcast test area, the base station initially transmitting a burst of the user area by a first transmission mode, the base station transmitting a test data by a second transmission mode in the broadcast test area as the transmission by the first transmission mode conforms to a specific situation, and calculating a first transmission quality coefficient of the first transmission mode and a second transmission quality coefficient of the second transmission mode, wherein the specific situation comprises one of changes of a transmitting speed, a carrier to interference plus noise power ratio (CINR) and a bit error rate (BER).

9. The base station of claim 8, wherein the base station transmits the burst by the second transmission mode as the second transmission quality coefficient is larger than the first transmission quality coefficient.

10. The base station of claim 8, wherein the base station transmits the test data in the broadcast test area by a third transmission mode as the first transmission quality coefficient is larger than the second transmission quality coefficient.

11. The base station of claim 8, wherein the first transmission quality coefficient and the second transmission quality coefficient individually respond to the specific situation's change of the first transmission mode and the second transmission mode.

12. The base station of claim 8, wherein the first transmission mode and the second transmission mode are different in modulation.

13. A computer program product for storing a computer program to execute a method for wireless communication utilizing a frame, the frame comprising a MAP area and a user area, the MAP area defining a broadcast test area, the computer program product comprising:

code for transmitting a burst of the user area by a first transmission mode;

code for transmitting a test data by a second transmission mode in the broadcast test area as the transmission by the first transmission mode conforms to a specific situation; and code for calculating a first transmission quality coefficient of the first transmission mode and a second transmission quality coefficient of the second transmission mode;

wherein the specific situation comprises one of changes of a transmitting speed, a carrier to interference plus noise power ratio (CINR) and a bit error rate (BER).

14. The computer program product of claim 13, further comprising:

code for transmitting the burst by the second transmission mode as the second transmission quality coefficient is larger than the first transmission quality coefficient.

15. The computer program product of claim 13, further comprising:

code for transmitting the test data by a third transmission mode in the broadcast test area as the first transmission quality coefficient is larger than the second transmission quality coefficient.

16. The computer program product of claim 13, wherein the first transmission quality coefficient and the second transmission quality coefficient individually respond to the specific situation's change of the first transmission mode and the second transmission mode.

17. The computer program product of claim 13, wherein the first transmission mode and the second transmission mode are different in modulation.

18. A computer program product for storing a computer program to execute a wireless communication method for transmitting a second frame according to a first frame, the first frame comprising a MAP area, the MAP area defining a broadcast test area, the second frame comprising a user area, the user area defining a first burst and a second burst, the computer program product comprising:

code for transmitting the first burst by a first transmission mode;

code for transmitting a request in the broadcast test area as the transmission by the first transmission mode conforms to a specific situation; and code for transmitting the first burst by the first transmission mode and the second burst by a second transmission mode in response to the request;

wherein the specific situation comprises one of changes of a transmission speed, a carrier to interference plus noise power ratio (CINR) and a bit error rate (BER).

19. The computer program product of claim 18, wherein the first transmission mode and the second transmission mode are different in transmission power.

* * * * *